June 17, 1958     J. N. CUTRONE     2,839,096
SAW CHAIN GUIDE BAR
Filed Nov. 8, 1955

Inventor:
John N. Cutrone.
By Foley & Lindberg
Attorneys.

United States Patent Office 2,839,096
Patented June 17, 1958

2,839,096

SAW CHAIN GUIDE BAR

John N. Cutrone, Chicago, Ill., assignor to Chain Tools, Incorporated, Chicago, Ill., a corporation of Illinois Application November 8, 1955, Serial No. 545,719

1 Claims. (Cl. 143—32)

This invention relates to improvements in guide bars for chain saws.

One of the common forms of guide bars for chain saws is a solid plate around which the endless chain moves and having sufficient thickness so that a peripheral groove may be provided in the edge of the guide bar to receive the inner portions of the chain guide links, thus retaining the chain against lateral separation from the guide bar. Suitable laterally extending shoulders or projections on opposite sides of the chain slidably engage the outer edge margin of this groove. In a currently popular type of chain such as is shown in the accompanying drawing these bearing elements or shoulders are provided on the tie straps and on the cutter links.

The shoulders on the tie straps and cutter links are in more or less continuous contact with the margins of the bar groove and however good the lubrication may be along the groove considerable friction does occur and power is required to overcome it. This friction is especially noticeable where the chain passes around the outer end of the guide bar. As a result of the friction not only is considerable power required to overcome it but wear on the guide bar groove in the course of time renders it unfit for use, requiring the replacement of the guide bar by a new one.

The principal object of my invention is to reduce the friction in that area of the guide bar where the chain passes around its outermost or free end, and this I accomplish by positioning a rotatable ring where it will be encountered by the guide links of the chain supporting them with little or no friction as they pass around the outer end of the guide bar while lifting the aforesaid shoulders away from sliding contact with the bar. In accomplishing the foregoing objective I provide a guide bar assembly which is economical to manufacture, and at the same time sturdy and durable.

Other objects and advantages of the invention will be mentioned hereinafter or will become apparent from a perusal of the following specification.

In the drawing:

Fig. 1 is a plan view below line 2—2 and a sectional view above line 2—2 of the outer end of a guide bar made in accordance with this invention, showing mounted thereon a commercially used chain of the type shown in U. S. Patent 2,508,784;

Figure 4:
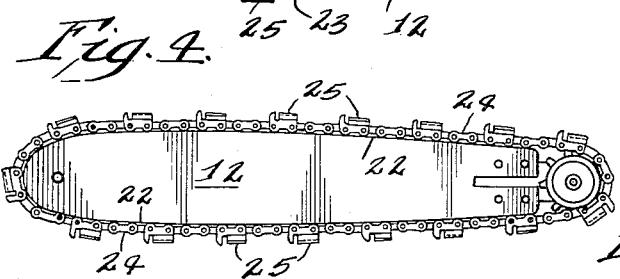
Fig. 4 is a plan view, on a reduced scale, showing the bar and a chain.

Referring now to the drawing, the guide bar assembly comprises a pair of outer plates 11 and 12 and an intermediate spacing plate 13 which, when assembled ready for operation, will be firmly secured together in any appropriate manner by riveting or, preferably, by spot welding. When viewed externally this assembly has the appearance illustrated in Fig. 4, and may be provided with conventional means for attachment to a power unit.

It should be noted that the intermediate plate 13 has a curved recess 14 shaped and spaced from the outer end of the bar to partially embrace the stationary disk 15 and the rotatable flat annular ring 16.

In place of the disk 15 I might provide an annular ring instead of the solid disk but the disk is preferable for a number of reasons relating to economy of manufacture and assembly. This disk when welded against the plate 11, for example, provides an inner race against which anti-friction bearing elements such as balls 17 may rotate, the rotatable ring 16 constituting the outer margin of the raceway. After the disk 15 has been welded to one of the plates 11 or 12 and the rotatable ring 16 arranged concentrically thereabout, the balls 17 or roller bearings, if desired, will be placed between the disk and the ring and, when the other plate is then welded against the disk and the ring and, when the other plate is then welded against the disk 15, the anti-friction elements are prevented from escaping.

The plate 13 and disk 15 will be of the same thickness and just thick enough to afford a groove of desired width at the edges of the bar. The ring 16 will be slightly thinner than the disk, for example, about .002" thinner, so that it may rotate freely.

When the device has been assembled the chain, for example, of the type shown, cooperates therewith as follows. The lateral margins 18 and 19 of the intermediate plate are located as shown, hence a recess or groove of ample depth is provided into which the chain guide links 21 may extend, while appropriate shoulders or bearing surfaces such as 20 on the chain ride along the outer margins 22 and 23 respectively of the guide bar plates 11 and 12. On a saw chain of the type indicated these bearing surfaces are the shoulders provided on the tie straps such as 24 and similarly placed shoulders on the cutter links 25, some of these shoulders being shown in contact with the edge 22 of plate 11 and edge 23 of plate 12 in Fig. 1.

Thus the chain is slidably supported against inward displacement by the outer plates 11 and 12 and guided against lateral displacement by the same plates, which is the conventional function of the bar groove.

Figure 1:
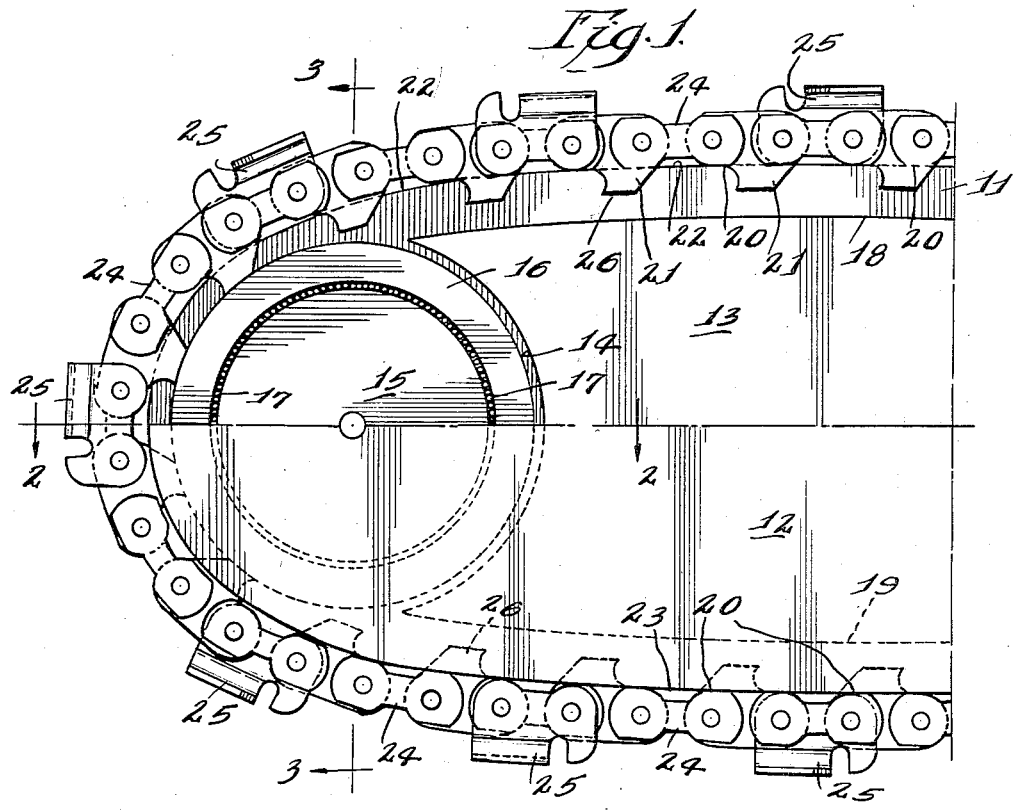
Figure 2:
Fig. 2 is a sectional view on the line 2—2 of Fig. 1.
Figure 3:
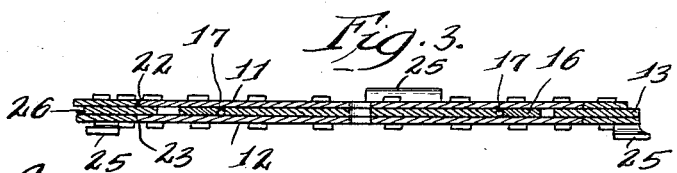
Fig. 3 is a sectional view on the line 3—3 of Fig. 1.

However, the disk 15 and the rotatable ring 16 are so located that when the innermost edge 26 of each of the drive links approaches the outer end of the guide bar these link edges will contact the rotatable ring 16 and lift the aforementioned bearing surfaces of the chain away from the plates 11 and 12, as indicated in Fig. 1 and Fig. 2. Thus, as the chain passes around the outer end of the guide bar it becomes guided only against lateral displacement by the plates 11 and 12 but otherwise rides on the ring 16. In view of the anti-friction bearing elements 17 its passage around the end of the bar is accomplished with a very much reduced friction which reduces the power load and reduces the wear on the end of the guide bar plates 11 and 12. The inner leg portions 21 of the guide links extend far enough between the guide plates so that there can be no lateral displacement of the chain, if it is conventionally tight enough.

In assembling this device, the plate 13 may be laid upon the plate 11, for example, in the position shown and lightly tacked thereto by a few spot welds. The disk 15 may then be located accurately in the position shown and likewise spot welded to the plate 11. Thereafter the ring 16 may be positioned about the disk and the bearing elements inserted in the narrow groove surrounding the disk. The next step is to place the other outside plate 12 to overlie this assembly and then preferably weld or braze all three plates together at close intervals to make a rugged laminated assembly of the three plates, with the disk 15 secured to both of them but with the ring 16 free to rotate therebetween.

Lubrication of the bearings and ring 16 does not present any great problem as conventional oiling of the chain will also oil the bearings and direction injection of oil into the bearings is a simple matter.

Chain bars not having idler wheels or pulleys at their outer ends wear very rapidly in that area. My invention will insure a longer useful life to a chain bar, by reducing friction and yet without weakening the bar assembly. Prior attempts to solve this problem have been unsatisfactory for various reasons.

The drawing shows one preferred embodiment of the invention. However, it should be understood that the invention comprehends some modification from the illustrated embodiment without departing from the scope of the invention defined in the appended claim.

Having shown and described my invention, I claim:

In combination with an endless saw chain having center links, opposed pairs of outer horizontally extending links connecting the center links, cutting teeth on some of said links, the center links having guide portions extending inwardly of the inner margins of said connecting links a predetermined distance, a guide bar assembly comprising a pair of outer plates and an intermediate plate of lesser width and length secured to and between the outer plates thereby providing a narrow peripheral groove between opposed marginal surfaces of the outer plates to receive and guide said guide portions throughout the entire course of travel of the chain along both longitudinal portions of the guide bar as well as around the free end of the bar, the peripheral edges of said outer plates being spaced outwardly from the longitudinal margins of the intermediate plate along the longitudinal portions of the guide bar a greater distance than said predetermined distance whereby the said peripheral edges of the outer plates constitute glide bearing surfaces for the inner margins of the connecting links and simultaneously hold said guide portions of the center links out of contact with said intermediate plate, an inner circular race member fixed between and secured to said outer plates adjoining the free end of the bar beyond the adjacent end of the intermediate plate, a rotatable ring surrounding said race member and anti-friction elements between the ring and race member, a substantial portion of the periphery of the ring at the free end of the bar being embraced by the marginal portions of the outer plates, the distance between the periphery of said portion of the ring and the adjacent peripheral margins of the outer plates being less than said predetermined distance whereby the ring engages the guide portions of the center links at the free end of the bar and simultaneously holds the connecting links out of contact with the peripheral edges of the outer plates at the free end of the bar.

References Cited in the file of this patent

UNITED STATES PATENTS

| | | |
|---|---|---|
| 1,260,702 | Olson | Mar. 26, 1918 |
| 1,786,641 | Berg | Dec. 30, 1930 |
| 2,316,997 | Smith | Apr. 20, 1943 |
| 2,432,567 | Forrest | Dec. 16, 1947 |
| 2,693,206 | Anttonen | Nov. 2, 1954 |